United States Patent
Yamawaki et al.

(10) Patent No.: US 12,474,422 B2
(45) Date of Patent: Nov. 18, 2025

(54) MAGNETIC SENSOR DEVICE

(71) Applicant: TDK CORPORATION, Tokyo (JP)

(72) Inventors: Kazuma Yamawaki, Tokyo (JP); Shuhei Miyazaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 143 days.

(21) Appl. No.: 18/344,309

(22) Filed: Jun. 29, 2023

(65) Prior Publication Data

US 2024/0019505 A1   Jan. 18, 2024

(30) Foreign Application Priority Data

Jul. 15, 2022   (JP) ................................. 2022-114350

(51) Int. Cl.
   *G01R 33/09*   (2006.01)

(52) U.S. Cl.
   CPC .................................. *G01R 33/09* (2013.01)

(58) Field of Classification Search
   CPC ...... G01R 33/09; G01R 33/02; G01R 33/093; G01R 33/098; G01B 7/30
   See application file for complete search history.

(56) References Cited

U.S. PATENT DOCUMENTS

| | | |
|---|---|---|
| 11,125,839 B2* | 9/2021 | Cai ...................... G01R 33/091 |
| 11,162,772 B2 | 11/2021 | Watanabe et al. |
| 2019/0101771 A1* | 4/2019 | Takimoto ............... G03B 13/36 |
| 2020/0241314 A1* | 7/2020 | Takimoto ............... H04N 23/54 |

FOREIGN PATENT DOCUMENTS

JP    2020-094883 A    6/2020

\* cited by examiner

*Primary Examiner* — Alesa Allgood
(74) *Attorney, Agent, or Firm* — Oliff PLC

(57) ABSTRACT

A magnetic sensor device includes a sensor substrate and a sensor element circuitry. The sensor substrate has a surface. The sensor element circuitry is provided on the surface of the sensor substrate and includes one or more magnetic sensor elements. As viewed in a plane parallel to the surface, the sensor substrate has a perimeter that is substantially octagonal. The perimeter includes two short sides opposed to each other, two long sides opposed to each other, and four corners. The four corners are each chamfered entirely or partially in a thickness direction that is substantially orthogonal to the surface. A ratio of a length of each of the four corners along each of the two long sides of the sensor substrate to a length of each of the two long sides of the sensor substrate is less than or equal to 0.39.

10 Claims, 11 Drawing Sheets

MAGNETIC SENSOR DEVICE

CROSS-REFERENCE TO RELATED APPLICATIONS

The present application claims priority from Japanese Patent Application No. 2022-114350 filed on Jul. 15, 2022, the entire contents of which are hereby incorporated by reference.

BACKGROUND

The disclosure relates to a magnetic sensor device.

A magnetic sensor device adapted to detect a component, in a predetermined direction, of an external magnetic field has been used in various applications. A magnetic sensor to be included in the magnetic sensor device may have a magnetic detection element provided on a substrate. Examples of the magnetic detection element include a magnetoresistive effect element.

For example, Japanese Unexamined Patent Application Publication (JP-A) No. 2020-094883 discloses a magnetic sensor device including a support, a first magnetic sensor, a first magnetic field generator, and a second magnetic field generator. The first magnetic sensor is integral with the support. In the magnetic sensor device disclosed in JP-A No. 2020-094883, the first magnetic field generator generates a first additional magnetic field and the second magnetic field generator generates a second additional magnetic field, which allows for accurate detection of an external magnetic field by the first magnetic sensor.

SUMMARY

A magnetic sensor device according to one embodiment of the disclosure includes a sensor substrate and a sensor element circuitry. The sensor substrate has a surface. The sensor element circuitry is provided on the surface of the sensor substrate and includes one or more magnetic sensor elements. As viewed in a plane parallel to the surface, that is, as viewed in a direction orthogonal to a plane parallel to the surface, the sensor substrate has a perimeter that is substantially octagonal. The perimeter includes two short sides opposed to each other, two long sides opposed to each other, and four corners. The four corners are each chamfered entirely or partially in a thickness direction that is substantially orthogonal to the surface. A ratio of a length of each of the four corners along each of the two long sides of the sensor substrate to a length of each of the two long sides of the sensor substrate is less than or equal to 0.39.

A magnetic sensor device according to one embodiment of the disclosure includes a sensor substrate and a sensor element circuitry. The sensor substrate has a surface. The sensor element circuitry is provided on the surface of the sensor substrate and includes one or more magnetic sensor elements. As viewed in a plane parallel to the surface, that is, as viewed in a direction orthogonal to a plane parallel to the surface, the sensor substrate has a perimeter that is substantially octagonal. The perimeter includes two short sides opposed to each other, two long sides opposed to each other, and four corners. The four corners are each chamfered entirely or partially in a thickness direction that is substantially orthogonal to the surface. As viewed in the plane, a ratio of a shortest distance from the perimeter of the sensor substrate to the sensor element circuitry to a length of each of the two long sides of the sensor substrate is greater than or equal to 0.28.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1A:
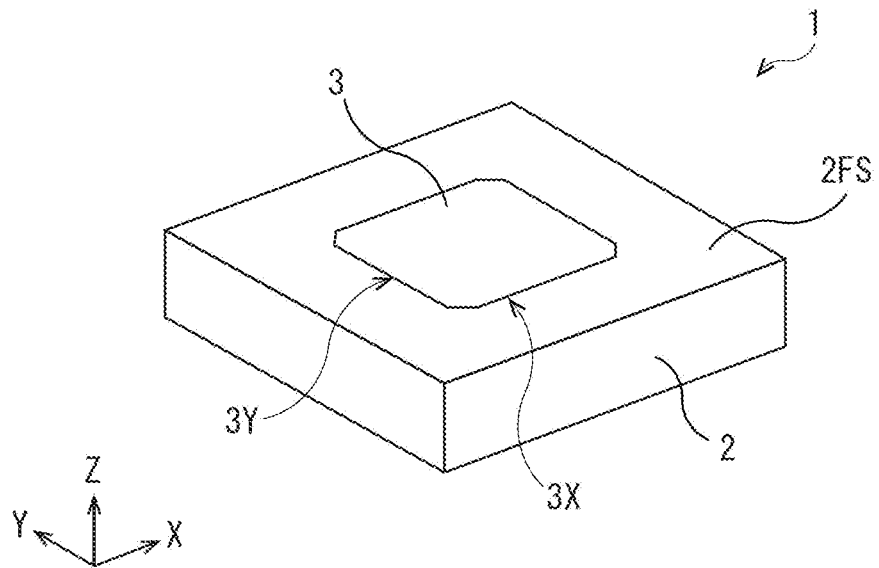
FIG. 1A is a first perspective diagram illustrating an overall configuration example of an angle sensor device according to one example embodiment of the disclosure.

It is desirable that a magnetic sensor device including a magnetic sensor achieve reduction in thickness as well as high measurement accuracy.

It is desirable to provide a magnetic sensor device that provides high measurement accuracy and is adaptable to further reduction in thickness.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings. Note that the description is given in the following order.

0. Background
   1. Example Embodiment: an example of an angle sensor device including a magnetoresistive effect element
      1.1. Configuration of Angle Sensor Device 1
      1.2. Method of Manufacturing Angle Sensor Device 1
      1.3. Example Workings and Example Effects
   2. Examples

0. BACKGROUND

An angle sensor device has been used that detects, for example, an orientation or a rotation angle of an object by sensing a change in an external magnetic field, for example. Such an angle sensor device is often attached to an object that makes a movement involving a change in orientation, such as a rotational movement, to thereby make a rotational movement or any other kind of movement together with the object. Accordingly, reduction in weight is demanded of the angle sensor device itself. Furthermore, improved measurement accuracy is also demanded. To meet such demands, it is desirable to densely pack a larger number of sensor elements in a limited region.

Having conducted many studies and improvements to address the above technical challenges, the Applicant has finally arrived at providing an angle sensor device that provides high measurement accuracy and is adaptable to further reduction in thickness.

1. FIRST EXAMPLE EMBODIMENT

1.1. Configuration of Angle Sensor Device 1

A description will be given first of a configuration of an angle sensor device 1 according to an example embodiment of the disclosure with reference to FIGS. 1A to 4. The angle sensor device 1 may correspond to a specific but non-limiting example of a "magnetic sensor device" in one embodiment of the disclosure.

Figure 1B:
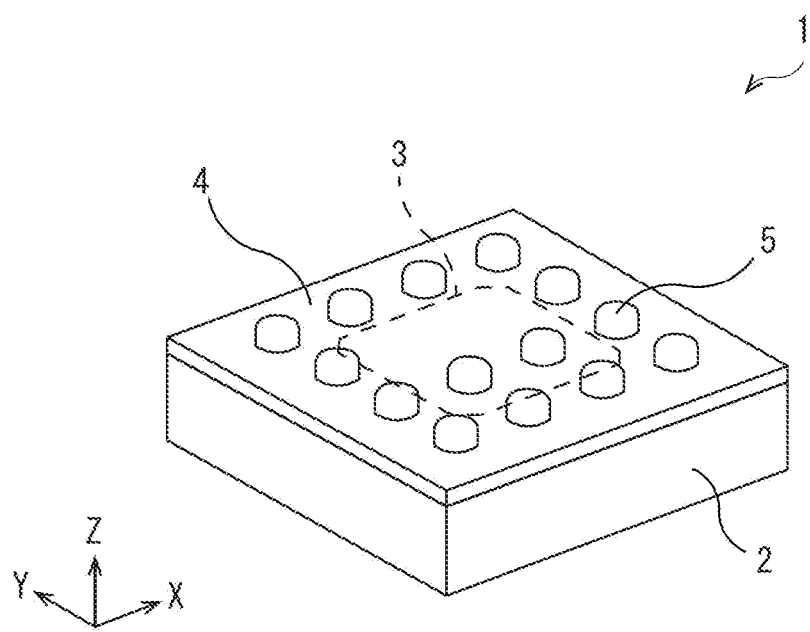
FIG. 1B is a second perspective diagram illustrating the overall configuration example of the angle sensor device according to one example embodiment of the disclosure.
Figure 2:
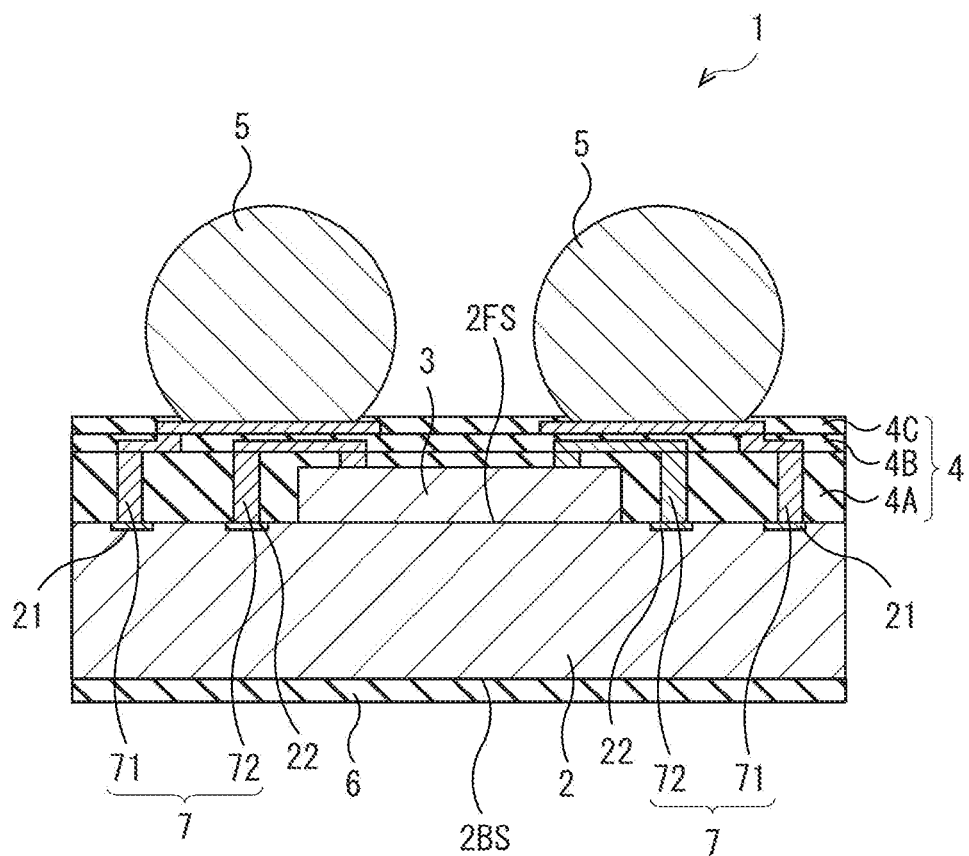
FIG. 2 is a cross-sectional view of the angle sensor device illustrated in FIG. 1A.

FIGS. 1A and 1B are perspective diagrams each illustrating an overall configuration example of the angle sensor device 1. FIG. 2 is a schematic cross-sectional view of the angle sensor device 1. As illustrated in FIG. 1B, the angle sensor device 1 may include a support substrate 2, a sensor chip 3, a wiring layer 4, and solder balls 5. As illustrated in FIG. 2, the sensor chip 3 may be stacked on the support substrate 2. For example, the sensor chip 3 may be provided on a front surface 2FS of the support substrate 2. The sensor chip 3 may be covered with the wiring layer 4. A protective film 6 may be provided on a back surface 2BS, opposite to the front surface 2FS, of the support substrate 2.

In the example embodiment, as illustrated in FIGS. 1A to 2, for example, the support substrate 2 and the sensor chip 3 may each extend along an XY plane including an X-axis direction and a Y-axis direction orthogonal to each other. A Z-axis direction may correspond to a thickness direction of the support substrate 2 and the sensor chip 3 in the example embodiment.

[Support Substrate 2]

In some embodiments, the support substrate 2 may include an application-specific integrated circuit (ASIC), for example. The front surface 2FS of the support substrate 2 may be provided with terminal parts 21 and 22.

[Sensor Chip 3]

Figure 3A:
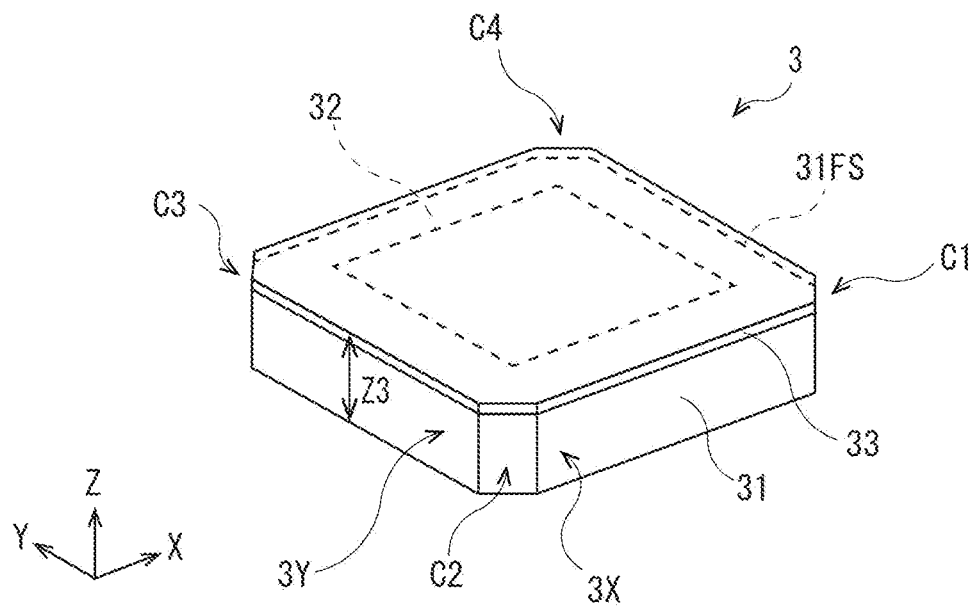
FIG. 3A is a perspective diagram illustrating an example external appearance of a sensor chip illustrated in FIG. 1A.
Figure 3B:
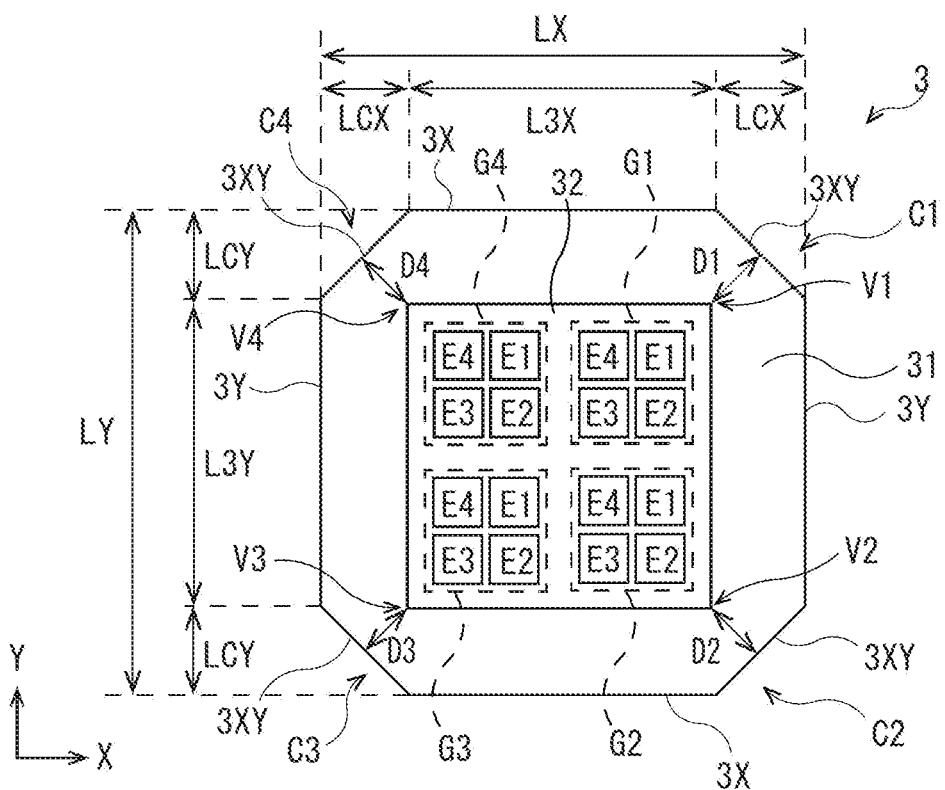
FIG. 3B is a plan diagram illustrating a planar configuration example of the sensor chip illustrated in FIG. 1A.

FIG. 3A is a perspective diagram schematically illustrating an example external appearance of the sensor chip 3. In a configuration example illustrated in FIG. 3A, the sensor chip 3 may have an external appearance of a substantially octagonal prism shape which is substantially octagonal in a planar view. The sensor chip 3 may include a sensor substrate 31, a sensor element circuitry 32, and a protective layer 33. FIG. 3B is a plan diagram schematically illustrating a layout of the sensor chip 3. Note that FIG. 3B omits the illustration of the protective layer 33. The sensor substrate 31 may be a silicon substrate, for example. The sensor substrate 31 may have an external appearance of a substantially polygonal prism shape including corners C that are each chamfered entirely in the thickness direction corresponding to a direction in which the support substrate 2 and the sensor chip 3 are stacked, i.e., the Z-axis direction. The sensor substrate 31 may have a front surface 31FS substantially orthogonal to the Z-axis direction. As used herein, "chamfered" refers to being shaped to have an outline segment extending in an oblique direction, not in a parallel or perpendicular direction, with respect to another outline segment in a planar view. In the configuration example illustrated in FIGS. 3A and 3B, the sensor substrate 31 may have an external appearance of a substantially octagonal prism shape including four corners C1 to C4. Further, in the illustrated configuration example, the corners C1 to C4 may each be chamfered to have a straight edge 3XY inclined at substantially 45 degrees with respect to both the X-axis direction and the Y-axis direction. Accordingly, in a planar view, the sensor substrate 31 may have a substantially octagonal outline including, for example, two edges 3X extending in the X-axis direction, two edges 3Y extending in the Y-axis direction, and four inclined edges 3XY each coupling corresponding one of the two edges 3X and corresponding one of the two edges 3Y to each other.

Figure 4:
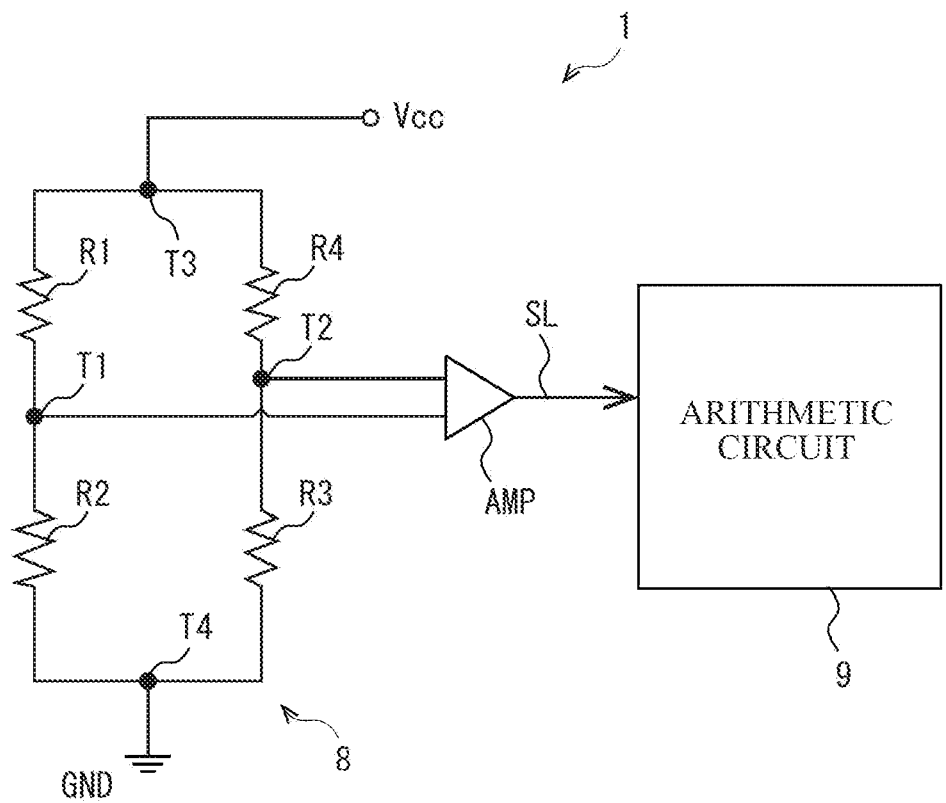
FIG. 4 is a circuit diagram of the angle sensor device illustrated in FIG. 1A.
Figure 4:
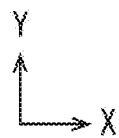

The sensor element circuitry 32 may be provided in a middle region on the front surface 31FS of the sensor substrate 31. The sensor element circuitry 32 includes one or more magnetic sensor elements E. In some embodiments, the magnetic sensor elements E may include tunneling magnetoresistive effect (TMR) elements. The sensor element circuitry 32 may include sensor element groups. In the configuration example of FIG. 3B, the sensor element circuitry 32 may include four sensor element groups G1 to G4 arranged in a matrix. The sensor element groups G1 to G4 may each include four magnetic sensor elements E1 to E4 arranged in a matrix, for example. The magnetic sensor elements E1 to E4 may each include, for example, TMR films and wiring lines coupling the TMR films in series to each other. The magnetic sensor elements E1 to E4 may configure resistors R1 to R4 of a full-bridge circuit 8 illustrated in FIG. 4, for example. FIG. 4 is a circuit diagram illustrating a circuit configuration example of the angle sensor device 1. The angle sensor device 1 may include, for example, the full-bridge circuit 8, a difference detector AMP, and an arithmetic circuit 9. The angle sensor device 1 may be configured to detect a change in an external magnetic field applied to the sensor chip 3, based on a difference between a potential obtained at a node T1 and a potential obtained at a node T2 in the full-bridge circuit 8.

The full-bridge circuit 8 may include the four resistors R1 to R4. The resistor R1 may include the magnetic sensor element E1, the resistor R2 may include the magnetic sensor element E2, the resistor R3 may include the magnetic sensor element E3, and the resistor R4 may include the magnetic sensor element E4. The full-bridge circuit 8 may have a configuration in which the resistors R1 and R2 coupled in series and the resistors R3 and R4 coupled in series are coupled in parallel to each other. For example, in the full-bridge circuit 8, a first end of the resistor R1 and a first end of the resistor R2 may be coupled to each other at the node T1; a first end of the resistor R3 and a first end of the resistor R4 may be coupled to each other at the node T2; a second end of the resistor R1 and a second end of the resistor R4 may be coupled to each other at a node T3; and a second end of the resistor R2 and a second end of the resistor R3 may be coupled to each other at a node T4. The node T3 may be coupled to a power supply Vcc, and the node T4 may be coupled to a ground terminal GND. The node T1 and the node T2 may each be coupled to an input-side terminal of the difference detector AMP.

The resistors R1 to R4 may each be configured to detect a change in a signal magnetic field to be detected. For example, the resistors R1 and R3 may each decrease in resistance value in response to application of a signal magnetic field in a +Y direction, and may each increase in resistance value in response to application of a signal magnetic field in a —Y direction. The resistors R2 and R4 may each increase in resistance value in response to application of the signal magnetic field in the +Y direction, and may each decrease in resistance value in response to application of the signal magnetic field in the —Y direction. Accordingly, a signal to be outputted from each of the resistors R1 and R3 in response to a change in the signal magnetic field and a signal to be outputted from each of the resistors R2 and R4 in response to the change in the signal magnetic field may be different in phase by 180 degrees from each other, for example. The signals extracted from the resistors R1 to R4 of the full-bridge circuit 8 may flow into the difference detector AMP. The difference detector AMP may detect a potential difference between the nodes T1 and T2, that is, a difference between respective voltage drops occurring at the resistors R1 and R4, when a voltage is applied between the nodes T3 and T4, and may output the detected difference to the arithmetic circuit 9 as a difference signal SL.

In some embodiments, the sensor element circuitry 32 may have a substantially polygonal outline with multiple vertexes V in a planar view. One or more of the multiple vertexes V may each be opposed to any one of the four chamfered corners C of the sensor substrate 31. In the configuration example of FIGS. 3A and 3B, the sensor element circuitry 32 may have a substantially rectangular or square outline with four vertexes V1 to V4 in a planar view. The vertexes V1 to V4 may be opposed to the four chamfered corners C1 to C4 of the sensor substrate 31, respectively.

In some embodiments, in the sensor chip 3, a shortest distance D from a perimeter of the sensor substrate 31 to the sensor element circuitry 32 may be greater than or equal to 0.015 mm in an XY in-plane direction orthogonal to the thickness direction or the Z-axis direction. In the configuration example of FIGS. 3A and 3B, a distance D1 from the edge 3XY of the corner C1 to the vertex V1 of the sensor element circuitry 32, a distance D2 from the edge 3XY of the corner C2 to the vertex V2 of the sensor element circuitry 32, a distance D3 from the edge 3XY of the corner C3 to the vertex V3 of the sensor element circuitry 32, and a distance D4 from the edge 3XY of the corner C4 to the vertex V4 of the sensor element circuitry 32 may be equal to each other, and may each be the shortest distance D.

The sensor substrate 31 may have a length LX in the X-axis direction and a length LY in the Y-axis direction. Although FIG. 3B illustrates an example case in which the lengths LX and LY are equal, embodiments of the disclosure are not limited thereto. For example, the lengths LX and LY may be different from each other. The lengths LX and LY may each be approximately 0.64 mm. In such a case, a length LCX in the X-axis direction and a length LCY in the Y-direction of each of the four corners C1 to C4 may each be greater than 0 mm and less than or equal to 0.2 mm. In the XY in-plane direction, a ratio of the shortest distance D from the perimeter, or the edge 3XY, of the sensor substrate 31 to the sensor element circuitry 32 to a length of a long side of the sensor substrate 31 may be greater than or equal to 0.28. The long side of the sensor substrate 31 corresponds to a longer one of the two kinds of edges 3X and 3Y. The length of the long side (3X or 3Y) is denoted as L3X or L3Y. Thus, the ratio D/L3X or D/L3Y may be greater than or equal to 0.28. In some embodiments, the sensor chip 3 may have a thickness Z3 of 200 μm or less, for example.

In the sensor chip 3, a ratio of the length LCX or LCY of each of the corners C1 to C4 along the length of the long side of the sensor substrate 31, i.e., along the longer one of the two lengths L3X and L3Y, to the length L3X or L3Y of the long side may be less than or equal to That is, the ratio LCX/L3X or LCY/L3Y may be less than or equal to 0.39.

Note that the two edges 3X have respective lengths different from each other, and the two edges 3Y may have respective lengths different from each other. When the two edges 3X correspond to two long sides of the sensor substrate 31, in the XY in-plane direction, the ratio D/L3X of the above-described shortest distance D to the length L3X of each of the two edges 3X may be greater than or equal to 0.28. When the two edges 3Y correspond to the two long sides of the sensor substrate 31, in the XY in-plane direction, the ratio D/L3Y of the above-described shortest distance D to the length L3Y of each of the two edges 3Y may be greater than or equal to 0.28.

When the two edges 3X correspond to the two long sides of the sensor substrate 31, the ratio LCX/L3X of the length LCX of each of the corners C1 to C4 along each of the two edges 3X to the length L3X of each of the two edges 3X may be less than or equal to 0.39. When the two edges 3Y correspond to the two long sides of the sensor substrate 31, the ratio LCY/L3Y of the length LCY of each of the corners C1 to C4 along each of the two edges 3Y to the length L3Y of each of the two edges 3Y may be less than or equal to 0.39.

In some embodiments, in the sensor chip 3, a ratio of an area of the sensor element circuitry 32 to an area of the sensor substrate 31 may be less than or equal to 0.69, as viewed in a plane orthogonal to the thickness direction, that is, as viewed in the XY plane.

[Wiring Layer 4]

As illustrated in FIG. 2, the wiring layer 4 may have a stacked structure including three resin layers 4A to 4C, for example. The resin layers 4A to 4C may each include, for example, polyimide, and may be provided to cover the sensor chip 3. Wiring line groups 7 may be embedded in the wiring layer 4. The wiring line groups 7 may each include a wiring line 71 and a wiring line 72, for example. The wiring line 71 may electrically couple the terminal part 21 of the support substrate 2 and corresponding one of the solder balls 5 to each other. The wiring line 72 may electrically couple the terminal part 22 of the support substrate 2 and the sensor chip 3 to each other.

1.2. Method of Manufacturing Angle Sensor Device 1

A description will now be given of a method of manufacturing the angle sensor device 1 according to an example embodiment of the disclosure with reference to FIGS. 5A to 5G, in addition to FIG. 2. FIGS. 5A to 5G schematically illustrate steps of an example method of manufacturing the angle sensor device 1.

Figure 5A:
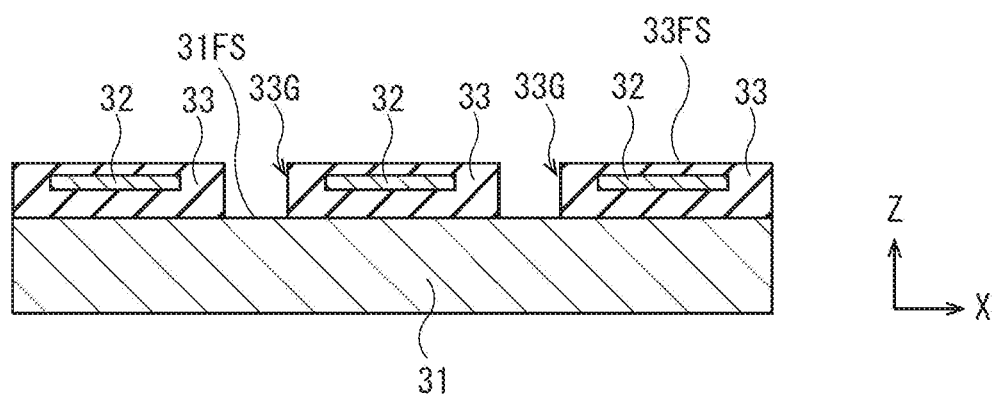
FIG. 5A is an explanatory diagram illustrating a step of an example method of manufacturing the angle sensor device illustrated in FIG. 1A.

First, as illustrated in FIG. 5A, the sensor substrate 31 including, for example, a silicon substrate, may be prepared, following which, a plurality of protective layers 33 may be formed on the front surface 31FS of the sensor substrate 31. The protective layers 33 may have the respective sensor element circuitries 32 embedded therein. The protective layers 33 may be formed to allow a spacing, that is, to have a gap G, between every adjacent ones of the protective layers 33. The protective layers 33 may each be provided with a perimeter having a substantially octagonal plan shape, for example.

Figure 5B:
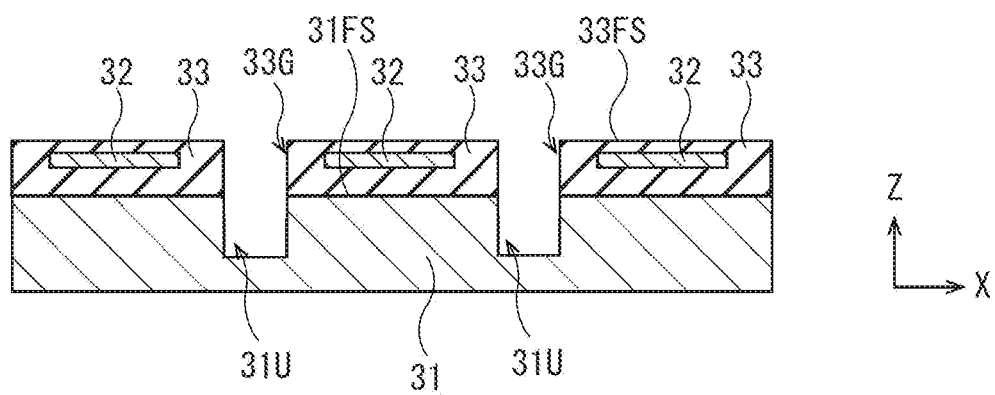
FIG. 5B is an explanatory diagram illustrating a step that follows the step of FIG. 5A.

Next, as illustrated in FIG. 5B, trenches 31U may be formed down into regions of the front surface 31FS of the sensor substrate 31 exposed in the gaps 33G. For example, a method of forming the trenches 31U may be, and is not limited to, reactive ion etching (RIE). The trenches 31U may be formed to cause the perimeter of the sensor substrate 31 to have a substantially octagonal plan shape that is substantially the same as the plan shape of the perimeter of each of the protective layers 33.

Figure 5C:
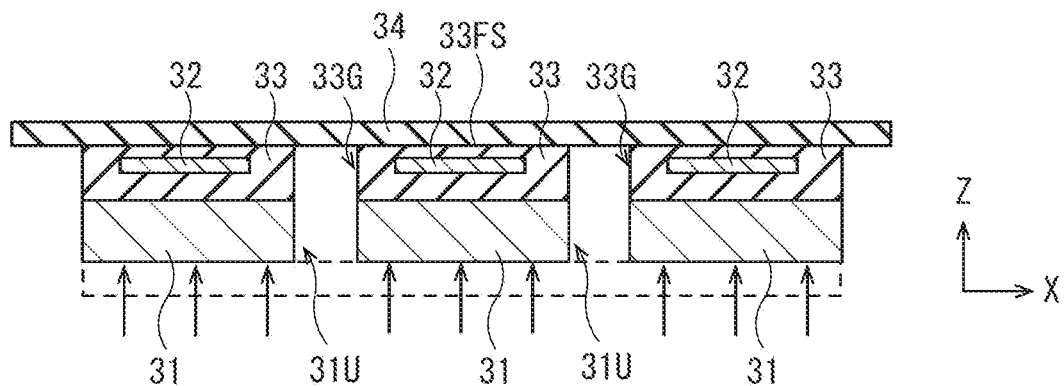
FIG. 5C is an explanatory diagram illustrating a step that follows the step of FIG. 5B.
Figure 5D:
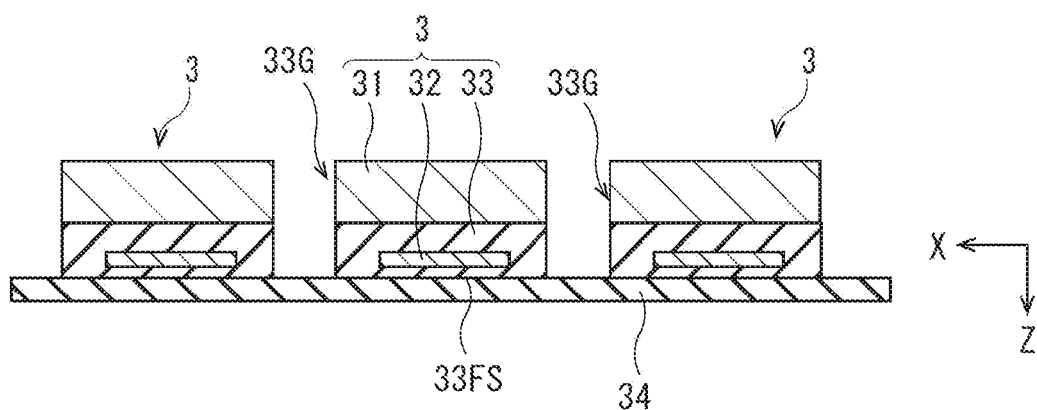
FIG. 5D is an explanatory diagram illustrating a step that follows the step of FIG. 5C.

Next, as illustrated in FIG. 5C, a tape 34 may be attached to a front surface 33FS of the protective layer 33, following which a back surface of the sensor substrate 31 may be polished using, for example, a rotating grinding wheel, to thereby remove a portion in the thickness direction of the sensor substrate 31 over the entire back surface. The polishing may be performed to reach bottom surfaces of the trenches 31U. This allows for formation of a plurality of singulated sensor chips 3, as illustrated in FIG. 5D. At this stage, the singulated sensor chips 3 may be in a state of adhering to the tape 34. Note that the orientation of the sensor chips 3 and the tape 34 in FIG. 5D is upside down from that in FIG. 5C.

Figure 5E:
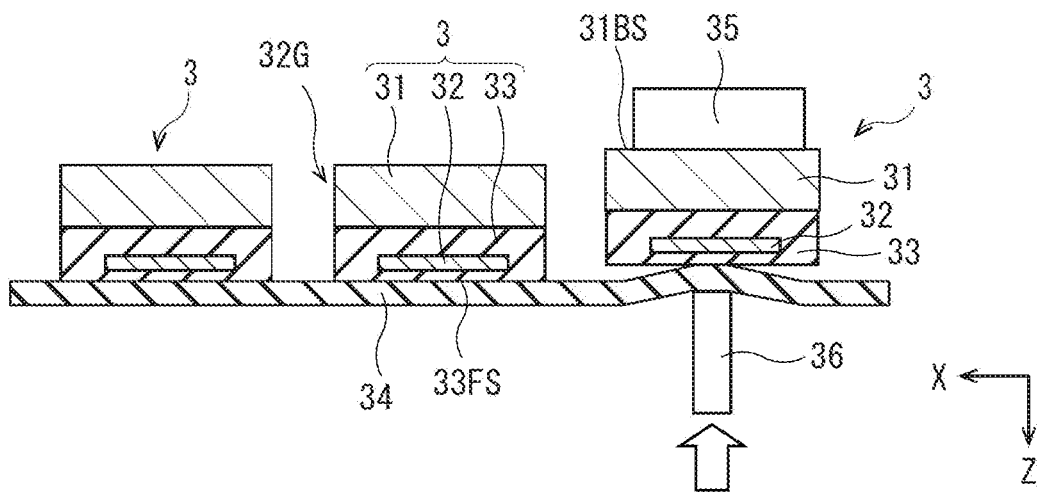
FIG. 5E is an explanatory diagram illustrating a step that follows the step of FIG. 5D.

Next, as illustrated in FIG. 5E, with a pickup collet 35 caused to adhere to the back surface 31BS of the sensor substrate 31, a portion of the tape 34 may be pushed up with a pin 36 to thereby pick up a single sensor chip 3. The sensor chips 3 may be thereby picked up one by one.

Figure 5F:
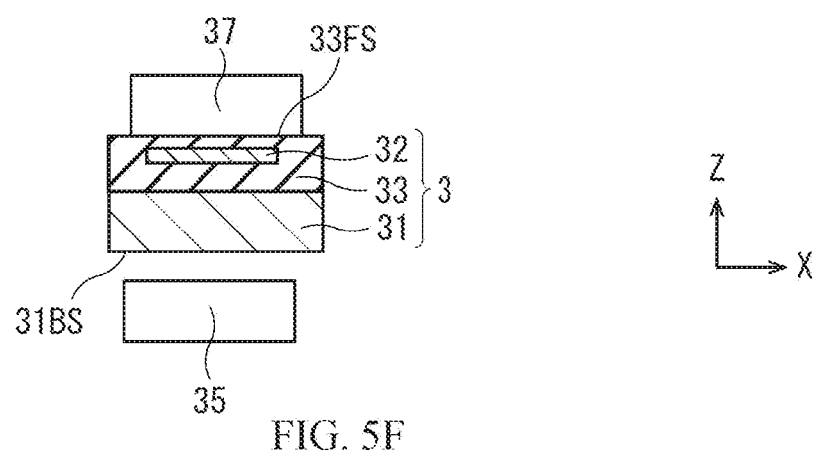
FIG. 5F is an explanatory diagram illustrating a step that follows the step of FIG. 5E.

Thereafter, as illustrated in FIG. 5F, the front surface 33FS of the protective layer 33 of the sensor chip 3 may be suctioned and held by a bonding collet 37, and the pickup collet 35 may be detached from the sensor substrate 31. Note that the orientation of the sensor chip 3 in FIG. 5F is upside down from that in FIG. 5E.

Figure 5G:
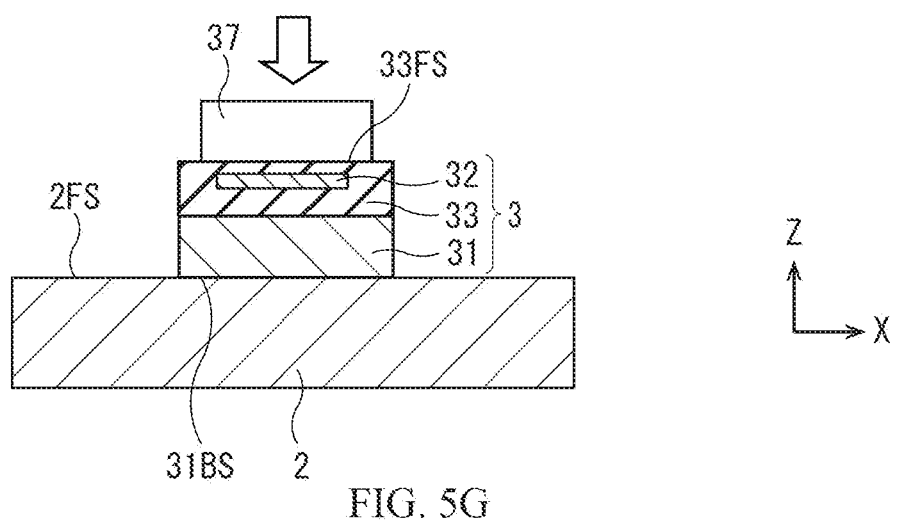
FIG. 5G is an explanatory diagram illustrating a step that follows the step of FIG. 5F.

Next, as illustrated in FIG. 5G, the back surface 31BS of the sensor substrate 31 may be bonded to the front surface 2FS of the support substrate 2 prepared, with use of, for example, an adhesive. The sensor chip 3 may be thereby fixed onto the support substrate 2.

Thereafter, the wiring layer 4 may be formed to cover the sensor chip 3 provided on the support substrate 2. The wiring layer 4 may include a resin such as polyimide. Thereafter, portions of the wiring layer 4 may be selectively removed by, for example, photolithography, and the wiring lines 71 and 72 may be formed by, for example, plating. Lastly, the solder balls 5 may be formed. The protective film 6 may be formed on the back surface 2BS of the support substrate 2 on an as-needed basis.

The angle sensor device 1 according to the example embodiment may be completed in the above-described manner.

1.3. Example Workings and Example Effects

In the angle sensor device 1 according to the example embodiment, the sensor substrate 31 may have a substantially polygonal prism shape including the corners C that are each chamfered. This allows for mitigation of concentration of stress on the corners C when an external force is applied to the sensor substrate 31. The sensor substrate 31 is thus shaped to have high mechanical strength, which helps to achieve reduction in thickness of the sensor substrate 31.

Supposing, however, the sensor substrate 31 has a rectangular prism shape which is rectangular in planar view without the four corners being chamfered, stress would be concentrated on the four corners when an external force is applied to the sensor substrate 31. In such a case, when each of the singulated sensor chips 3 is being picked up as illustrated in FIG. 5E in the manufacturing process, for example, the sensor chip 3 can be broken upon pushing up by the pin 36. In contrast, according to the example embodiment, the shape of the sensor substrate 31 with the chamfered corners helps to avoid such breakage of the sensor chip 3.

Furthermore, in the angle sensor device 1, owing to the mitigation of the concentration of stress on the corners C of the sensor substrate 31, distortion of the sensor element circuitry placed on the sensor substrate 31 is reduced, which helps to reduce an influence on measurement accuracy. Accordingly, the angle sensor device 1 is adaptable to further reduction in thickness while ensuring measurement accuracy.

2. EXAMPLES

Examples 1 to 7

Figure 6A:
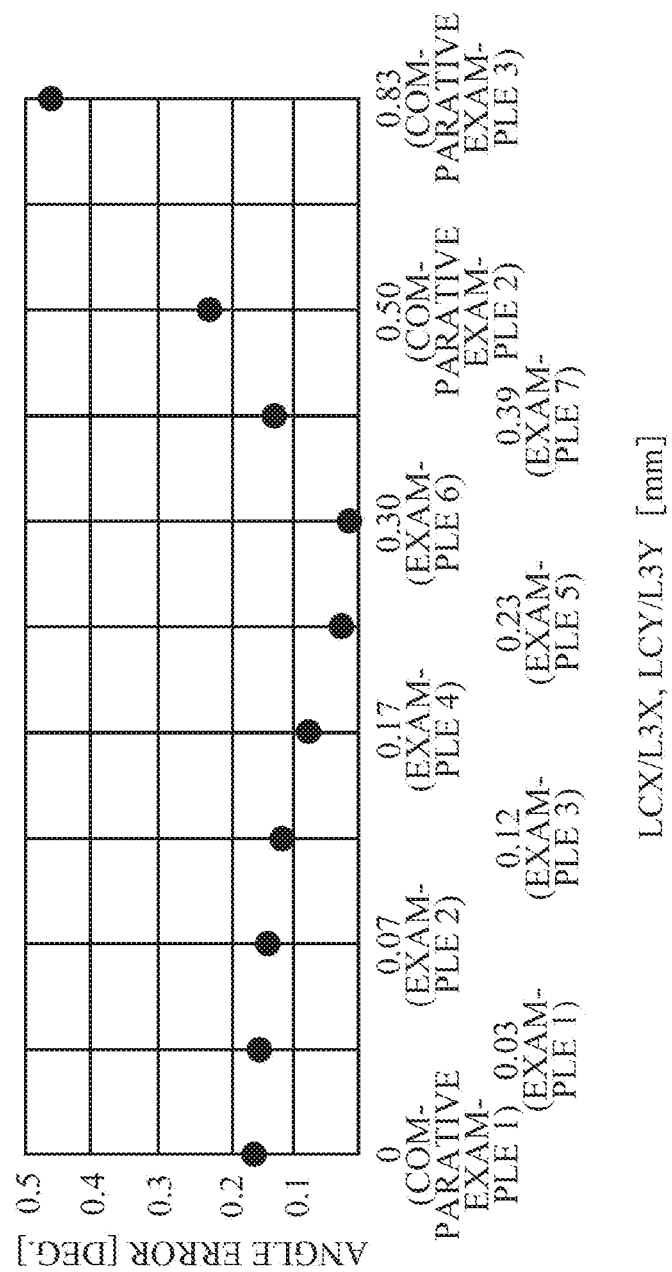
FIG. 6A is a characteristic diagram illustrating an angle error of each of angle sensor devices of Examples 1 to 7.

The angle sensor device 1 of the above-described example embodiment illustrated in, for example, FIG. 1 was examined for performance. In more detail, for each of Examples 1 to 7, the angle sensor device 1 including the sensor chip 3 illustrated in, for example, FIGS. 3A and 3B was fabricated and a maximum angle error [deg.] was determined by simulation. In the sensor substrates 31 of Examples 1 to 7, the lengths LX and LY were both set to 0.64 mm, the lengths LCX and LCY of each of the corners C1 to C4 were both set to a range from 0.02 mm to 0.14 mm both inclusive. Thus, the ratios LCX/L3X and LCY/L3Y were set to a range from approximately 0.03 to approximately 0.39. The thicknesses Z3 of the sensor chips 3 were set to 200 μm. FIG. 6A illustrates a relation of the ratios LCX/L3X and LCY/L3Y versus the angle error [deg.] determined by simulation. FIG.

6B illustrates a relation of LCX/L3X and LCY/L3Y versus the ratios D/L3X and D/L3Y.

Comparative Example 1

Figure 6B:
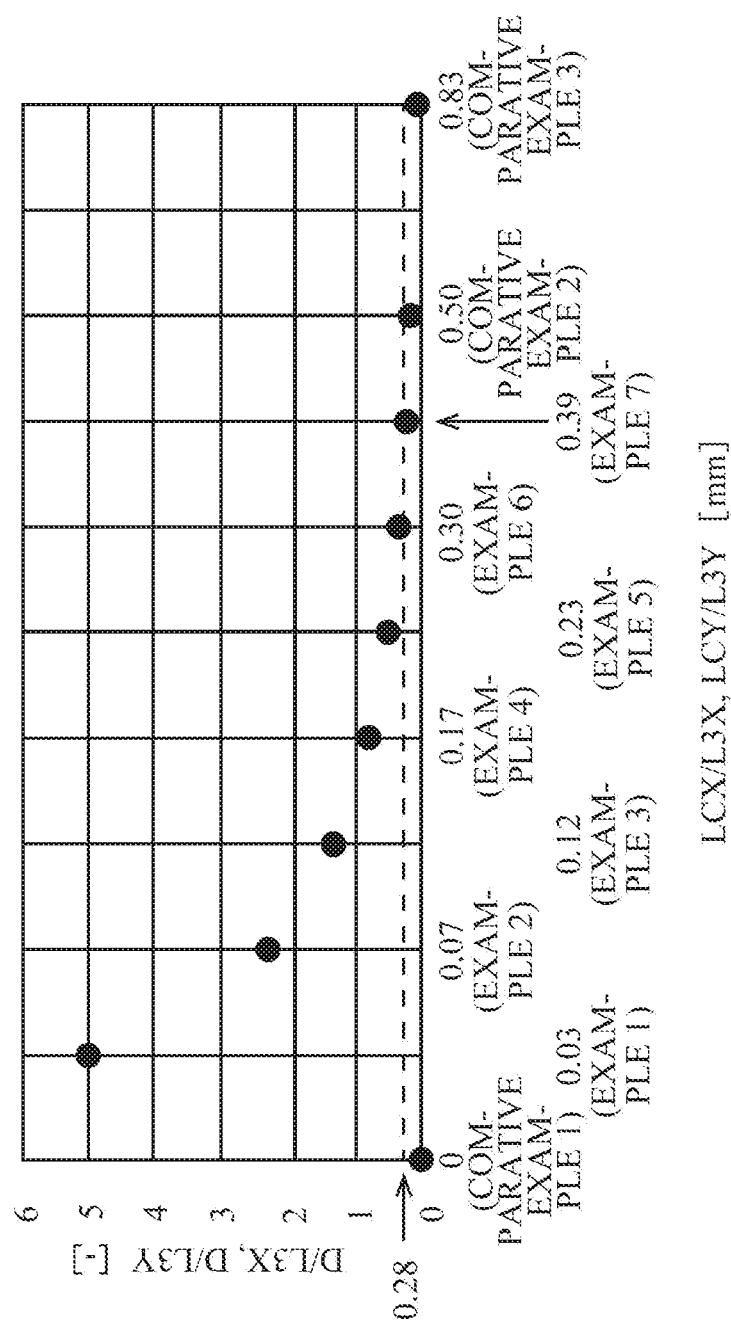
FIG. 6B is a characteristic diagram illustrating a ratio of a shortest distance from a perimeter of a sensor substrate to a sensor element circuitry to a length of a long side of the sensor substrate in each of the angle sensor devices of Examples 1 to 7.

For Comparative Example 1, the angle sensor device 1 including the sensor chip 3 similar to the sensor chips 3 of Examples 1 to 7 except for the following difference was fabricated and subjected to an evaluation similar to that for each of Examples 1 to 7. For the sensor chip 3 of Comparative Example 1, none of the corners were chamfered, that is, the lengths LCX and LCY were both set to 0 mm. Results of the evaluation are illustrated in FIGS. 6A and 6B, together with the results for Examples 1 to 7.

Comparative Examples 2 and 3

For Comparative Examples 2 and 3, the angle sensor devices 1 including the sensor chips 3 similar to the sensor chips 3 of Examples 1 to 7 except for the following respective differences were fabricated and were each subjected to an evaluation similar to that for each of Examples 1 to 7. For the sensor chip 3 of Comparative Example 2, in the sensor substrate 31, the lengths LCX and LCY of each of the corners C1 to C4 were both set to 0.16 mm, with the lengths LX and LY kept at 0.64 mm; thus, the ratios LCX/L3X and LCY/L3Y were both set to 0.50. For the sensor chip 3 of Comparative Example 3, in the sensor substrate 31, the lengths LCX and LCY of each of the corners C1 to C4 were both set to 0.20 mm, with the lengths LX and LY kept at 0.64 mm; thus, the ratios LCX/L3X and LCY/L3Y were both set to approximately 0.83. Results of the evaluations are illustrated in FIGS. 6A and 6B, together with the results for Examples 1 to 7 and Comparative Example 1.

The results illustrated in FIG. 6A indicate that when the lengths LCX and LCY of each of the chamfered corners are greater than zero and less than or equal to 0.14 mm, that is, when the ratios LCX/L3X and LCY/L3Y are less than or equal to 0.39, it is possible to reduce the angle error as compared with Comparative Example 1 having the rectangular sensor chip with no chamfered corners. Further, the results illustrated in FIG. 6B indicate that when the ratios D/L3X and D/L3Y are greater than or equal to 0.28, it is possible to make the ratios LCX/L3X and LCY/L3Y less than or equal to 0.39.

The example embodiment and Examples described above are to facilitate understanding of the disclosure, and are not intended to limit the disclosure. Each element disclosed in the foregoing example embodiment and Examples shall thus be construed to include all design modifications and equivalents that fall within the technical scope of the disclosure. In other words, the disclosure is not limited to the foregoing example embodiment and Examples, and may be modified in a variety of ways.

Figure 7:
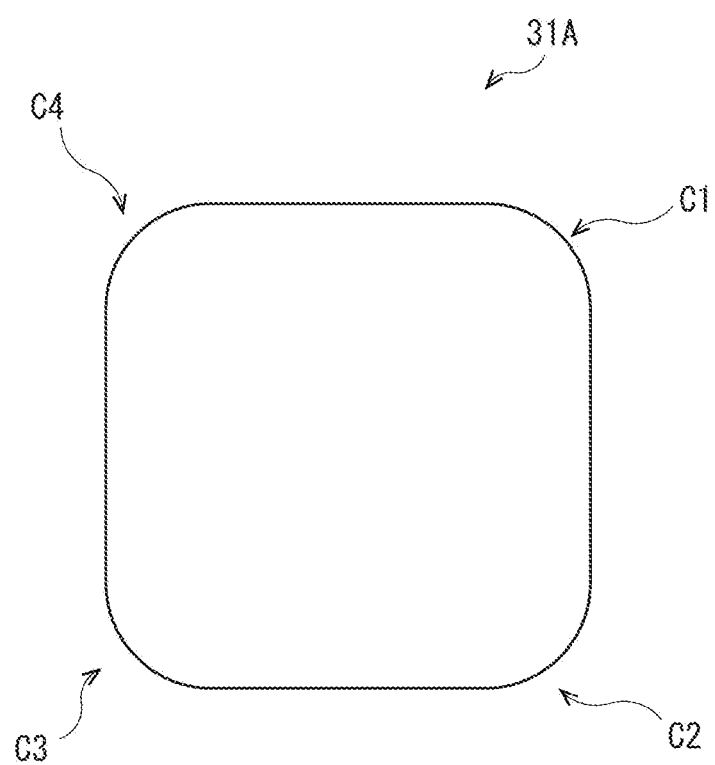
FIG. 7 is a plan diagram illustrating a sensor substrate of an angle sensor device according to a first modification example of one example embodiment of the disclosure.

For example, regarding the angle sensor device 1 according to the foregoing example embodiment, the sensor substrate 31 having a substantially octagonal shape in a planar view is described as an example; however, embodiments of the disclosure are not limited thereto. In some embodiments, the plan shape of the sensor substrate may have a polygonal perimeter with seven or less, or nine or more vertexes. Further, the chamfered corners are not limited to those having a straight edge. In some embodiments, the chamfered corners may each have an edge curved outward with respect to a middle of the sensor substrate, as in a sensor substrate 31A according to a first modification example illustrated in FIG. 7, for example.

Figure 8A:
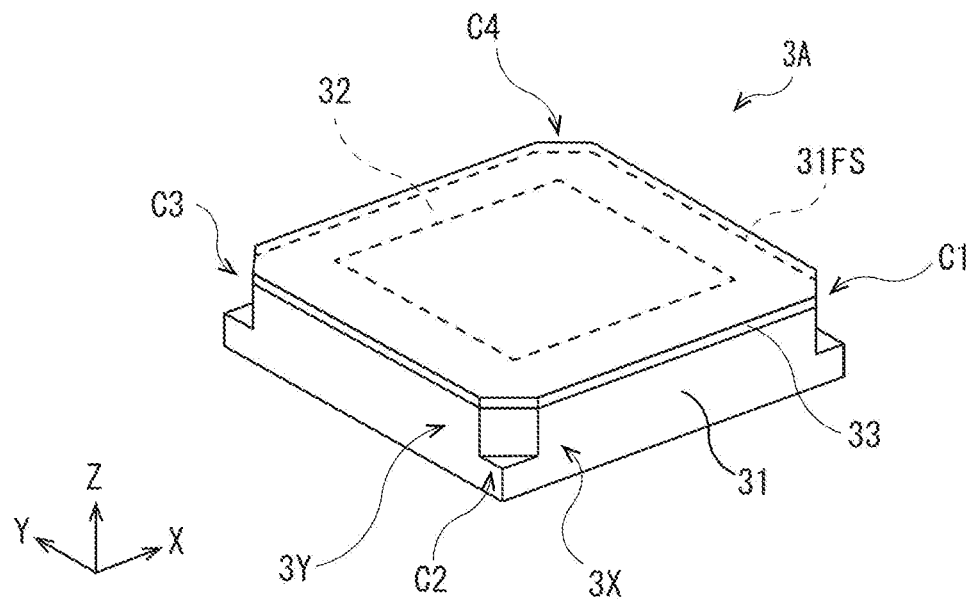
FIG. 8A is a perspective diagram illustrating an example external appearance of a sensor chip of an angle sensor device according to a second modification example of one example embodiment of the disclosure.
Figure 8B:
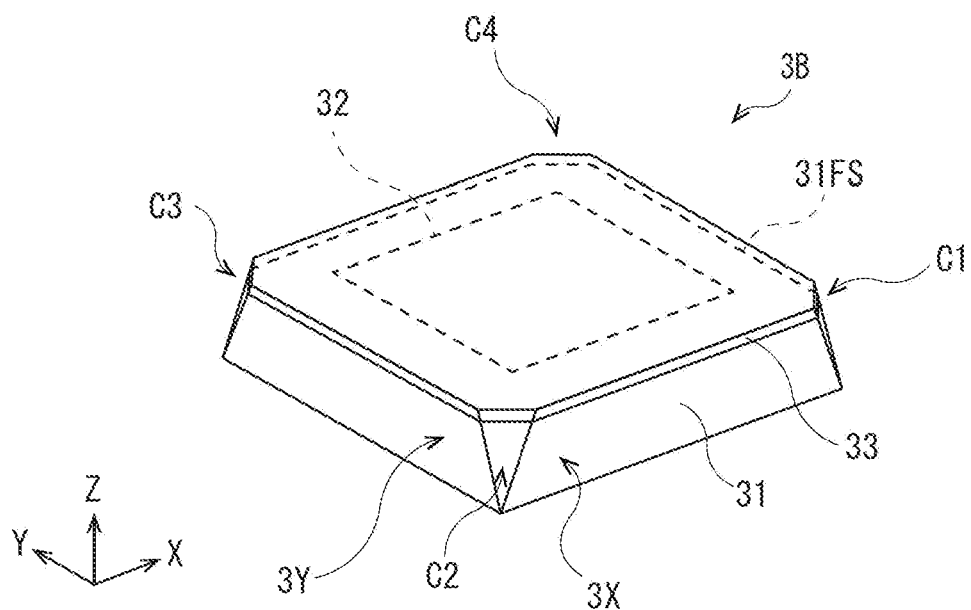
FIG. 8B is a perspective diagram illustrating an example external appearance of a sensor chip of an angle sensor device according to a third modification example of one example embodiment of the disclosure.

In the sensor chip 3 of the angle sensor device 1 according to the foregoing example embodiment, the corners C1 to C4 may be chamfered entirely in the thickness direction substantially orthogonal to the front surface 31FS; however, embodiments of the disclosure are not limited thereto. In some embodiments, the corners C1 to C4 may be chamfered only partially in the thickness direction of the sensor substrate 31, as in a sensor chip 3A according to a second modification example illustrated in FIG. 8A, for example. Moreover, in some embodiments, chamfers at the corners C1 to C4 of the sensor substrate 31 may gradually change in width, as in a sensor chip 3B according to a third modification example illustrated in FIG. 8B. In other words, the outline of the front surface 31FS of the sensor substrate 31 may simply include any chamfers.

It is possible to achieve at least the following configurations from the foregoing example embodiment and modification examples of the disclosure.

(1)

A magnetic sensor device including:
  a sensor substrate having a surface; and
  a sensor element circuitry provided on the surface of the sensor substrate and including one or more magnetic sensor elements, in which
  as viewed in a plane parallel to the surface, the sensor substrate has a perimeter that is substantially octagonal, the perimeter including two short sides opposed to each other, two long sides opposed to each other, and four corners,
  the four corners are each chamfered entirely or partially in a thickness direction that is substantially orthogonal to the surface, and
  a ratio of a length of each of the four corners along each of the two long sides of the sensor substrate to a length of each of the two long sides of the sensor substrate is less than or equal to 0.39.

(2)

A magnetic sensor device including:
  a sensor substrate having a surface; and
  a sensor element circuitry provided on the surface of the sensor substrate and including one or more magnetic sensor elements, in which
  as viewed in a plane parallel to the surface, the sensor substrate has a perimeter that is substantially octagonal, the perimeter including two short sides opposed to each other, two long sides opposed to each other, and four corners,
  the four corners are each chamfered entirely or partially in a thickness direction that is substantially orthogonal to the surface, and
  as viewed in the plane, a ratio of a shortest distance from the perimeter of the sensor substrate to the sensor element circuitry to a length of each of the two long sides of the sensor substrate is greater than or equal to 0.28.

(3)

The magnetic sensor device according to (1) or (2), in which, as viewed in the plane, a shortest distance from the perimeter of the sensor substrate to the sensor element circuitry is greater than or equal to 0.015 millimeters.

(4)

The magnetic sensor device according to (1), in which, as viewed in the plane, a ratio of a shortest distance from the perimeter of the sensor substrate to the sensor element circuitry to the length of each of the two long sides of the sensor substrate is greater than or equal to 0.28.

(5)

The magnetic sensor device according to any one of (1) to (4), in which, as viewed in the plane, a ratio of an area of the sensor element circuitry to an area of the sensor substrate is less than or equal to 0.69.

(6)

The magnetic sensor device according to any one of (1) to (5), in which as viewed in the plane, the sensor element circuitry has a substantially polygonal shape with multiple vertexes, and one or more of the multiple vertexes are each opposed to any one of the four corners of the sensor substrate that are each chamfered.

(7)

The magnetic sensor device according to any one of (1) to (6), further including a support substrate supporting the sensor substrate, in which the support substrate includes an application-specific integrated circuit, and the sensor substrate includes an electric wiring line electrically coupling the application-specific integrated circuit and the sensor element circuitry to each other.

(8)

The magnetic sensor device according to any one of (1) to (7), in which the sensor substrate has a thickness of 200 micrometers or less.

(9)

The magnetic sensor device according to any one of (1) to (8), in which the one or more magnetic sensor elements include one or more tunneling magnetoresistive effect elements.

(10)

The magnetic sensor device according to any one of (1) to (9), in which the four corners that are each chamfered each have a straight edge, or an edge curved outward with respect to a middle of the sensor substrate.

In the magnetic sensor device according to at least one embodiment of the disclosure, the sensor substrate has a substantially polygonal prism shape including corners that are each chamfered. This makes it possible to mitigate the concentration of stress on the corners when an external force is applied to the sensor substrate.

In the magnetic sensor device according to at least one embodiment of the disclosure, the sensor substrate is shaped to have high mechanical strength, which makes it possible to achieve reduction in thickness of the sensor substrate. Furthermore, owing to the mitigation of the concentration of stress on the corners of the sensor substrate, distortion of the sensor element circuitry placed on the sensor substrate is reduced, which allows for reducing an influence on measurement accuracy. This makes it possible to adapt to further reduction in thickness while ensuring high measurement accuracy.

It is to be noted that the effects of the disclosure should not be limited thereto, and may be any of the effects described herein.

Although the disclosure has been described hereinabove in terms of the example embodiment and modification examples, the disclosure is not limited thereto. It should be appreciated that variations may be made in the described example embodiment and modification examples by those skilled in the art without departing from the scope of the disclosure as defined by the following claims. The limitations in the claims are to be interpreted broadly based on the language employed in the claims and not limited to examples described in this specification or during the prosecution of the application, and the examples are to be construed as non-exclusive. The use of the terms first, second, etc. do not denote any order or importance, but rather the terms first, second, etc. are used to distinguish one element from another. The term "substantially" and its variants are defined as being largely but not necessarily wholly what is specified as understood by one of ordinary skill in the art. The term "disposed on/provided on/formed on" and its variants as used herein refer to elements disposed directly in contact with each other or indirectly by having intervening structures therebetween. Moreover, no element or component in this disclosure is intended to be dedicated to the public regardless of whether the element or component is explicitly recited in the following claims.

What is claimed is:

1. A magnetic sensor device comprising:
a sensor substrate having a surface; and
a sensor element circuitry provided on the surface of the sensor substrate and including one or more magnetic sensor elements, wherein
as viewed in a plane parallel to the surface, the sensor substrate has a perimeter that is substantially octagonal, the perimeter including two first sides each extending along a first direction, two second sides each extending along a second direction different from the first direction, and four corners,
the four corners are each chamfered entirely or partially in a thickness direction that is substantially orthogonal to the surface, and
a first ratio, a second ratio, or both are less than or equal to 0.39, the first ratio being a ratio of a length of each of the four corners along the first direction to a length of each of the two first sides of the sensor substrate, the second ratio being a ratio of a length of each of the four corners along the second direction to a length of each of the two second sides of the sensor substrate.

2. The magnetic sensor device according to claim 1, wherein, as viewed in the plane, a shortest distance from the perimeter of the sensor substrate to the sensor element circuitry is greater than or equal to 0.015 millimeters.

3. The magnetic sensor device according to claim 1, wherein, as viewed in the plane, a ratio of a shortest distance from the perimeter of the sensor substrate to the sensor element circuitry to the length of each of the two first sides of the sensor substrate is greater than or equal to 0.28.

4. The magnetic sensor device according to claim 1, wherein, as viewed in the plane, a ratio of an area of the sensor element circuitry to an area of the sensor substrate is less than or equal to 0.69.

5. The magnetic sensor device according to claim 1, wherein
as viewed in the plane, the sensor element circuitry has a substantially polygonal shape with multiple vertexes, and
one or more of the multiple vertexes are each opposed to any one of the four corners of the sensor substrate that are each chamfered.

6. The magnetic sensor device according to claim 1, further comprising a support substrate supporting the sensor substrate, wherein
the support substrate includes an application-specific integrated circuit, and
the sensor substrate includes an electric wiring line electrically coupling the application-specific integrated circuit and the sensor element circuitry to each other.

7. The magnetic sensor device according to claim 1, wherein the sensor substrate has a thickness of 200 micrometers or less.

8. The magnetic sensor device according to claim 1, wherein the one or more magnetic sensor elements comprise one or more tunneling magnetoresistive effect elements.

9. The magnetic sensor device according to claim 1, wherein the four corners that are each chamfered each have a straight edge, or an edge curved outward with respect to a middle of the sensor substrate.

10. A magnetic sensor device comprising:
    a sensor substrate having a surface; and
    a sensor element circuitry provided on the surface of the sensor substrate and including one or more magnetic sensor elements, wherein
    as viewed in a plane parallel to the surface, the sensor substrate has a perimeter that is substantially octagonal, the perimeter including two first sides each extending along a first direction, two second sides each extending along a second direction different from the first direction, and four corners,
    the four corners are each chamfered entirely or partially in a thickness direction that is substantially orthogonal to the surface, and
    as viewed in the plane, a first ratio, a second ratio, or both are greater than or equal to 0.28, the first ratio being a ratio of a shortest distance from the perimeter of the sensor substrate to the sensor element circuitry to a length of each of the two first sides of the sensor substrate, the second ratio being a ratio of the shortest distance from the perimeter of the sensor substrate to the sensor element circuitry to a length of each of the two second sides of the sensor substrate.

* * * * *